United States Patent
Sudo

[11] Patent Number: 5,831,844
[45] Date of Patent: Nov. 3, 1998

[54] HIGH VOLTAGE GENERATING CIRCUIT ABLE TO GENERATE POSITIVE HIGH VOLTAGE AND NEGATIVE HIGH VOLTAGE AT THE SAME TIME

[75] Inventor: Naoaki Sudo, Tokyo, Japan

[73] Assignee: NEC Corporation, Tokyo, Japan

[21] Appl. No.: 910,171

[22] Filed: Aug. 13, 1997

[30] Foreign Application Priority Data

Aug. 15, 1996 [JP] Japan .................................. 8-215627

[51] Int. Cl.$^6$ ............................................ H02M 7/19
[52] U.S. Cl. ............................................. 363/60; 307/110
[58] Field of Search ................................. 363/59, 60, 61, 363/126; 307/109, 110; 320/1

[56] References Cited

U.S. PATENT DOCUMENTS

| | | | |
|---|---|---|---|
| 4,485,433 | 11/1984 | Topich | 363/60 |
| 4,922,402 | 5/1990 | Olivo et al. | 363/60 |
| 4,922,403 | 5/1990 | Feller | 363/60 |
| 5,559,687 | 9/1996 | Nicollini et al. | 363/60 |

FOREIGN PATENT DOCUMENTS 3-15266  1/1991  Japan .

*Primary Examiner*—Adolf Berhane
*Attorney, Agent, or Firm*—Sughrue, Mion, Zinn, Macpeak & Seas, PLLC

[57] ABSTRACT

A plurality of diode-connected MOS transistors are arranged in cascade connection, and clocks are supplied to nodes between the MOS transistors. A node (N40) is connected to a first voltage source line (VCC) via a first switch (SW1), a node (N46) is connected to a second voltage source (GND) via a second switch (SW2), an intermediate node (N43) is connected to a third voltage source (VCC) via a third switch (SW3). The third switch is turned ON and the first and second switches are turned OFF to output the positive high voltage (VPP) from the node (N46) and also to output the negative high voltage (VBB) from the node (N40).

6 Claims, 7 Drawing Sheets

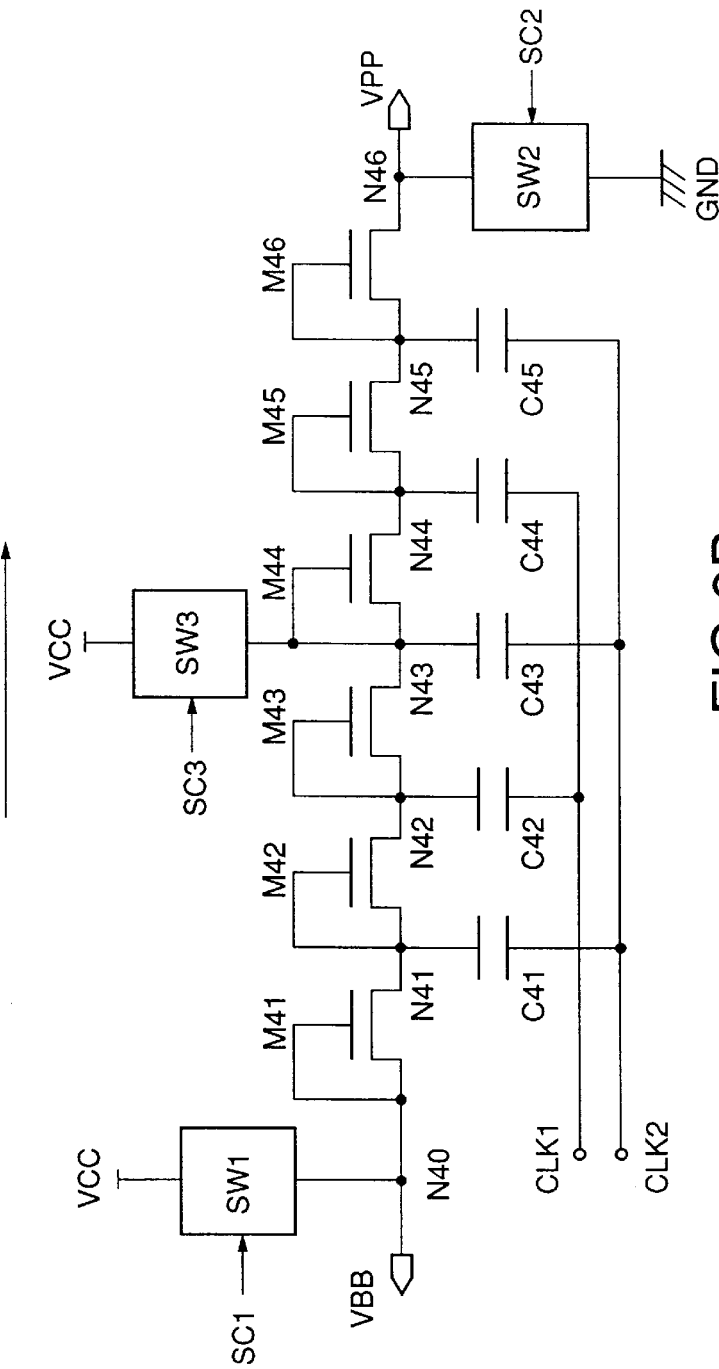
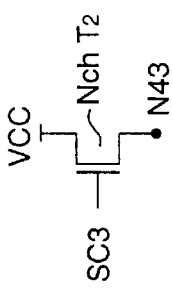
FIG.3A
FIG.3B

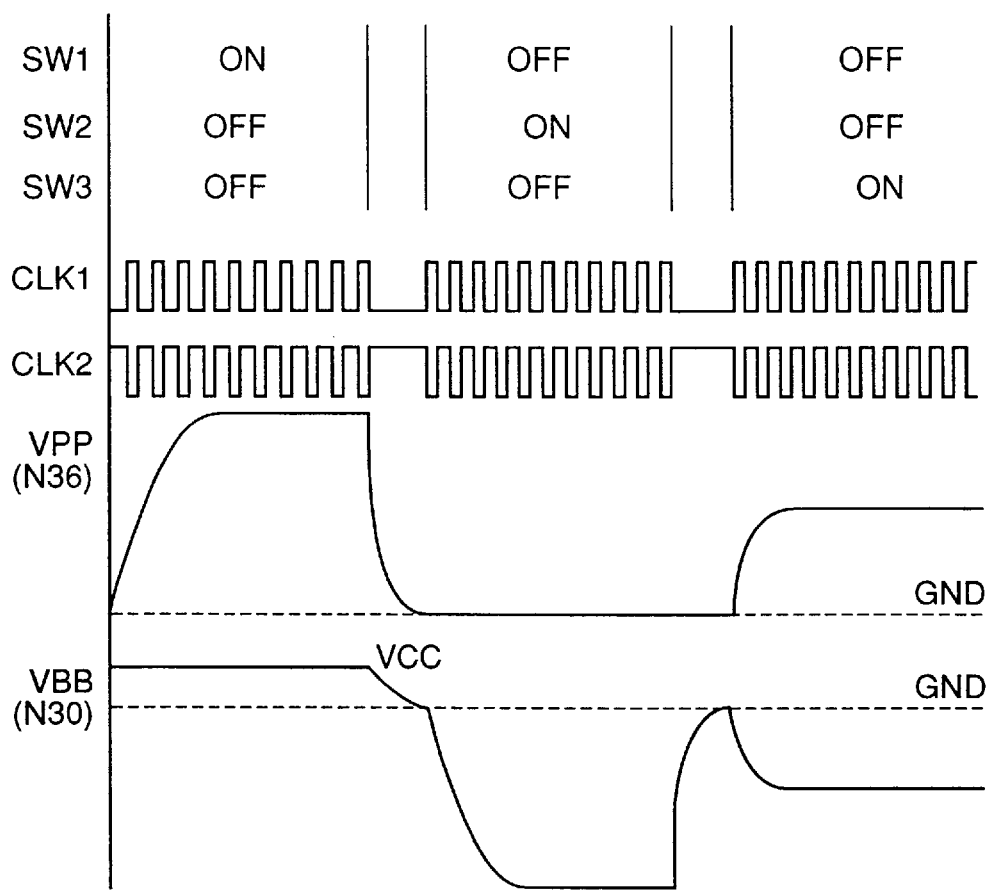

|       | G   | S    | D              |       |
|-------|-----|------|----------------|-------|
| WRITE | -9V | 6V   | OPEN           | MODE3 |
| ERASE | 15V | OPEN | GND            | MODE1 |
| READ  | 6V  | 1V   | GND OR OPEN    | MODE3 |

HIGH VOLTAGE GENERATING CIRCUIT ABLE TO GENERATE POSITIVE HIGH VOLTAGE AND NEGATIVE HIGH VOLTAGE AT THE SAME TIME

BACKGROUND OF THE INVENTION

The present invention relates to a high voltage generating circuit and, more particularly, to a high voltage generating circuit which generates both positive high voltage and negative high voltage.

In a semiconductor memory device such as an EEPROM or a flash memory, a high voltage above a power source is used to write or erase data. For this purpose, a variety of high voltage generating circuits have conventionally been used in order to generate such high voltage in a chip. Especially in a flash memory, positive and negative high voltages may be used for writing data and positive voltage may be used for erasing data. As a result plurality of booster circuits are provided in the chip.

Figs. 1A–C show the examples of a conventional charge transport type high voltage generating circuits.

FIG. 1A shows a conventional positive high voltage generating circuit, as disclosed for example, in Japanese Patent Application Laid-Open No. 3-15266. The circuit includes a plurality of stages of the pairs of capacitors and MOS transistors arranged in cascade connection. For example, a circuit constituent unit 10, enclosed by a dotted line in the drawing, is constructed by a MOS transistor M12 having gate and source connected to a node N12 and drain connected to a capacitor C12 receiving a clock pulse CLK1. These circuit constituent units 10 are connected in cascade by nodes N11 through N14, and CLK1 and CLK2 are supplied to the capacitors of every other circuit constituent unit so as to provide positive high voltages VPP and VCC by so-called "charge pumping."

FIG. 1B shows a conventional negative high voltage generating circuit. The circuit is also constructed by a plurality of stages of circuit constituent units 20 comprised of MOS transistors and capacitors arranged in cascade connection. The circuit receives clock pluses CLK1 and CLK2 to provide negative high voltage VBB. Clock pluses CLK1 and CLK2 denote complementary clock voltages illustrated in FIG. 1C.

In the high voltage generating circuit shown in FIG. 1A, when the circuit is placed in an enable state, the complementary clock voltages CLK1 and CLK2 are supplied from a clock generating circuit (not shown) to the high voltage generating circuit. In the circuit constituent unit 10, the clock CLK1 is applied to the capacitor C12. When the clock CLK1 changes at a high level, while the clock CLK2 is at a low level, the voltage value at the node N12 increases due to the coupling of the capacitor C12, and current flows from the node N12 to the node N13, causing the voltage value at the node N13 to become lower than that at the node N12 by the threshold value of the transistor. Then, when the clock CLK1 switches to the low level, the voltage at the node N12 tries to drop by the amplitude voltage of the clock due to the coupling of the capacitor C12. However, the current supplied from the node N11 in the preceding stage causes the voltage at node N12 to become higher than that when CLK1 was at the low level previously. This charge pumping is repeated a plurality of times to supply current from the left to the right in FIG. 1, so that positive high voltage VPP, which depends on the clock amplitude, the number of pumping stages, the capacitance of the capacitors, etc., is normally output from the final stage of the high voltage generating circuit.

The negative high voltage generating circuit shown in FIG. 1B shares the same basic operation with the positive high voltage generating circuit shown in FIG. 1A. However, the input and the output of these two circuits are reversed. More specifically, the gates of the MOS transistors are connected inversely and the direction in which the voltage rises is accordingly reversed. Thus, in the negative high voltage generating circuit, the voltage drops toward the output. The input is fixed to the ground (GND); therefore, a negative high voltage which is lower than GND is output at the output side.

In the case of the conventional high voltage generating circuit, however, a plurality of the high voltage generating circuits shown in FIG. 1A and FIG. 1B must be mounted on a chip when positive and negative high voltages are required for writing data and positive high voltage is required for erasing the data in a nonvolatile semiconductor memory device such as an EEPROM or a flash memory as described previously. This inevitably adds to the mounting area, hindering the efforts to reduce the size of the chip.

To cope with the problem mentioned above, a high voltage generating circuit as shown in FIG. 2A is considered, wherein high voltage and negative voltage are switched to provide outputs. In this high voltage generating circuit, a node N35 where the potential reaches the highest value and a node N30 where the potential reaches the lowest value are provided with switches composed of MOS transistors M37 and M36, respectively; these switches are turned ON and OFF to switch between high voltage and negative voltage to output them from the single high voltage generating circuit. For instance, as illustrated in FIG. 2B, when a signal SW for driving the switches is set to the low level to turn the switch M36 ON and to turn the switch M37 OFF, the potential at the node N30 will be nearly equal to the fixed voltage VCC, and the positive high voltage is output at the output terminal VPP connected to the node N35. When the signal SW is set to the high level to turn the switch M37 ON and to turn the switch M36 OFF, the potential at the node N35 where the potential becomes the highest will be nearly equal to the fixed potential GND, and the negative high voltage is output at the output terminal VBB connected to the node N30 where the potential becomes the highest.

The high voltage generating circuit shown in FIG. 2A permits the positive and negative high voltages to be output from a single high voltage generating circuit by the switching operation. This is advantageous in that it requires less mounting area, so that the chip size may be reduced in contrast to the circuit configuration shown in Figs. 1A–1B.

However, in the circuit shown in FIG. 2A and FIG. 2B, the positive and negative high voltages are selectively output. Therefore, this type of circuit cannot be applied to a case where both positive and negative high voltages are required at the same time. Hence, when both positive and negative high voltages are required, a plurality of high voltage generating circuits must he mounted on the chip just like the circuit shown in Figs. 1A–1B. Thus, the area required for mounting the high voltage generating circuits on the chip increases, leading to an increased size of the chip. Moreover, demand is increasing for a lower power source in response to a trend toward less power consumption in semiconductor memory devices. In the high voltage generating circuit, however, lowering the power source unavoidably reduces the clock amplitude voltage, which results in lower output. This has been posing a problem in that the area of the high voltage generating circuit is larger and the chip is accordingly larger.

SUMMARY OF THE INVENTION

An object of the present invention is to provide a high voltage generating circuit which employs a single high voltage generating circuit to output selectively and simultaneously positive and negative high voltages, thereby permitting a chip to be made smaller.

A voltage generating circuit of the present invention comprises first, second, and third nodes, first and second rectifying elements coupled in series between the first node and the third node, third and fourth rectifying elements coupled between the second and the third node, and a first control circuit operatively supplying a power voltage to the third node.

Another voltage generating circuit of the present invention comprises first and second nodes, a plurality of rectifying elements serially coupled between the first and second nodes, a plurality of capacitors each connected correspondingly to a connecting node between the rectifying elements, each of the capacitor receiving a clock signal, first, second and third power source lines, a first switch coupled between the first power source line and the first node, a second switch coupled between the second power source line and the second node, and a third switch coupled between the third power source line and one of the connecting nodes.

Another voltage generating circuit of the present invention comprises first and second nodes, a circuit coupled between the first node and the second node and coupled with a power source line, the circuit supplying a positive voltage to the first node when a first mode, supplying a negative voltage to the second node when a second node, and, when a third mode, supplied with a power voltage from the power source line and supplying a voltage higher than the power voltage to the first node and a voltage lower than the power voltage to the second node at the same time.

BRIEF DESCRIPTION OF THE DRAWINGS

The above and other objects, advantages and features of the present invention will be more apparent from the following description taken in conjunction with the accompanying drawings, in which:

FIG. 3A–B are a circuit diagram showing a high voltage generating circuit of a first embodiment according to the present invention;

FIG. 4 is a waveform diagram for describing the operation of the high voltage generating circuit shown in FIG. 1;

DESCRIPTION OF THE PREFERRED EMBODIMENTS

Figure 1A:
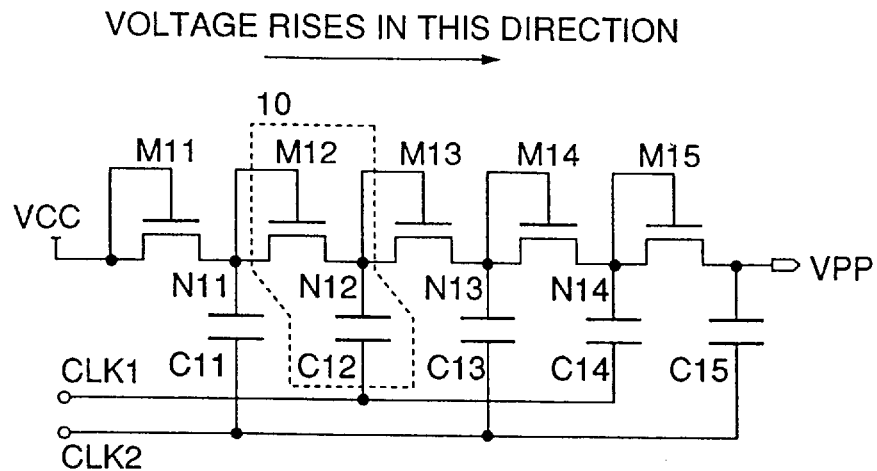
Figs. 1A–1C show the circuit diagrams and the clock waveforms of conventional high voltage generating circuits.
Figure 1B:
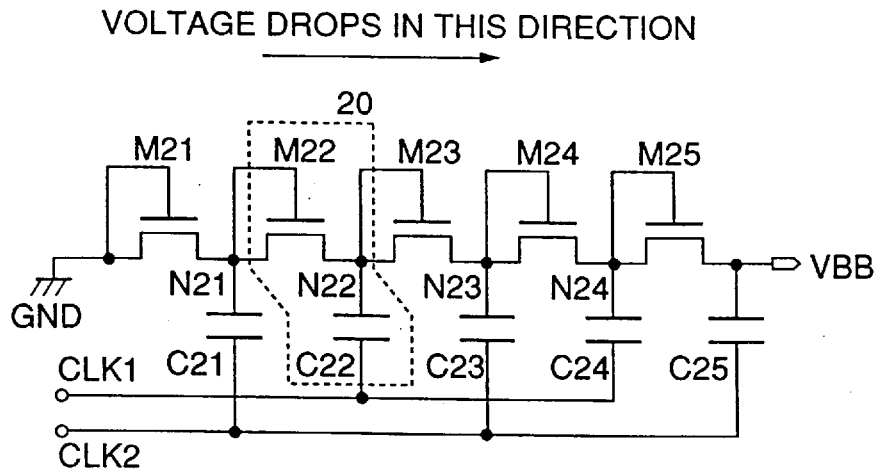
Figure 1C:
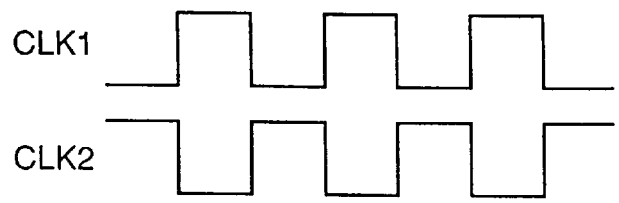
Figure 2A:
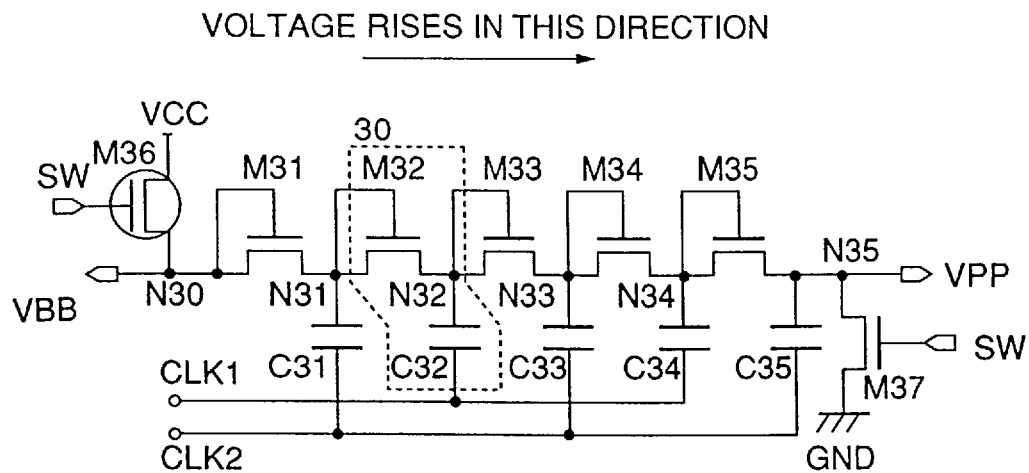
FIGS. 2A–2B show a circuit diagram and a waveform of an improved circuit configuration of a conventional high voltage generating circuit.
Figure 2B:
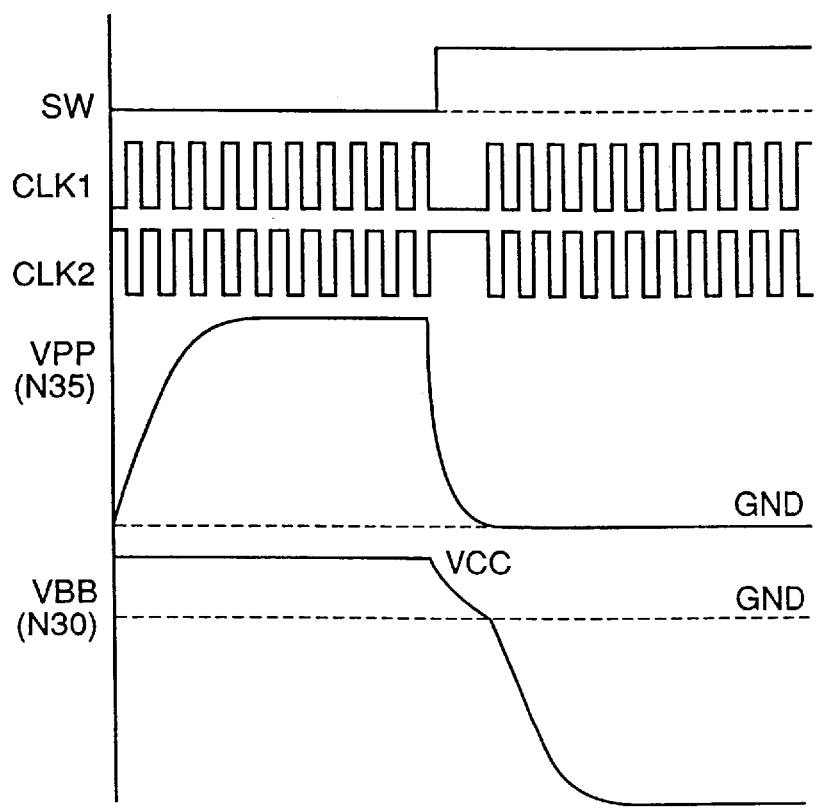

A high voltage generating circuit of the first embodiment of the preset invention shown in FIG. 3A is configured as a charge transport type high voltage generating circuit composed of a plurality of circuit constituent units arranged in cascade connection. More specifically, MOS transistors M41 through M45 and capacitors C41 through C45 make up the circuit constituent units, which the MOS transistors M41 through M45 have the respective drain/source paths between the respective between nodes N40 through N46 and their gates connected to the respective nodes N40 through N45. The nodes are connected to capacitors C41 through C45 respectively. Every other capacitor of the capacitors C41 through C45 is connected to clock CLK2, or CLK1. The node N40 is connected to a control circuit or a switch circuit SW1 receiving a voltage supplied from a power source line Vcc. The switch circuit SWl responds a switch control signal SC1 to turn ON to electrically connect the node N40 and the power source line Vcc. The node N46 is connected to a control circuit or a switch circuit Sw2 receiving a ground voltage supplied from a ground line GND. The switch circuit SW2 responds to a switch control signal SC2 to turn ON to electrically connect the node N46 and the ground line GND. The node N40 provides an output VBB at which the potential becomes the lowest, while the node N46 provides an output VPP at which the potential becomes the highest. A power source line VCC is connected to an appropriate intermediate node N43 via a control circuit or a switch SW3. FIG. 3B shows the circuit structure of the switch SW3. The switch SW3 responds the a control signal SC3 to turn ON to electrically connect the node N43 and the power source line Vcc. These three switches are individually turned ON/OFF to switch between the output VPP and the output VBB. The signals SC1–SC3 are controlled in response write commands, erase commands, and read command supplied from outside of the chip or produced in the chip. The power source VCC applied to the node N43 may be a voltage between the power source VCC applied to the node N40 and the ground voltage. The MOS transistor is n-channel type. The present invention is limited to MOS transistors. That is, The circuit constituent units may be a rectifying arranged in cascade connection.

The operation of the high voltage generating circuit of the first embodiment will now be described with reference to the waveform diagram given in FIG. 4. The clocks CLK1 and CLK2 are supplied and the high voltage generating circuit is operated first. When the switch SW1 turns ON, the switch SW2 turns OFF, and the switch SW3 turns OFF (mode 1), then positive high voltage is produced at the output VPP located at the end toward which the voltage rises in the high voltage generating circuit. When the switch SW2 turns ON, the switch SW1 turns OFF, and the switch SW3 turns OFF (mode 2), negative high voltage is produced at the output VBB located at the end toward which the voltage drops in the high voltage generating circuit. Further, when the switch SW3 turns ON (mode 3), the switch SW1 turns OFF, and the switch SW2 turns OFF, positive high voltage is produced at the output VPP located at the end toward which the voltage rises, while negative high voltage is produced at the output VBB located at the end toward which the voltage drops at the same time. The signal SW3 is GND voltage when the voltage VPP is outputted, the signal SW3 is VBB when the voltage VBB is outputted, and the signal SW3 is Vcc when both the voltage VPP and the voltage VBB is outputted.

Therefore, the single high voltage generating circuit is able to selectively produce only positive high voltage, only negative high voltage or both positive and negative high voltages by selectively turning ON/OFF the three switches SW1 through SW3. Thus, the high voltage generating circuit applied to a semiconductor memory device makes it possible to reduce the area occupied by the high voltage circuit, permitting reduction in the chip size even when positive and negative high voltages are required selectively or at the same time. Moreover, when the power source has been reduced to meet the demand for lower power consumption of a semiconductor memory device, even if it is necessary to increase the area for the high voltage generating circuit to deal with lower clock amplitude voltage, the increase of the chip size can be controlled to a minimum.

Figure 5:
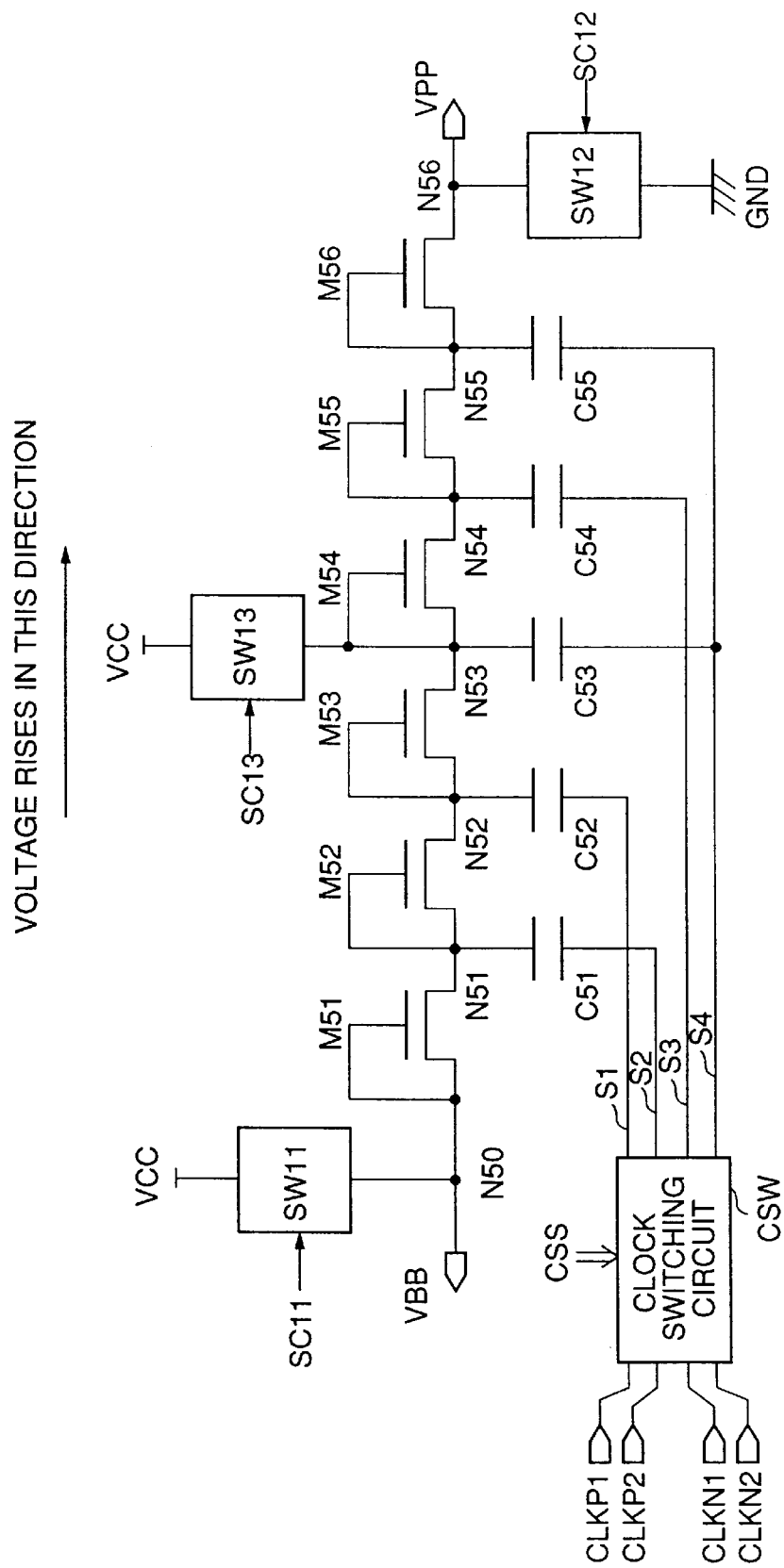
FIG. 5 is a circuit diagram of the high voltage generating circuit of a second embodiment and a third embodiment of the present invention.

FIG. 5 is a circuit diagram according to a second embodiment of the present invention. The second embodiment differs from the first embodiment in that a clock switching circuit CSW is provided before the charge pumping capacitors which receive clocks. The clock switching circuit CSW receives a clock switching signal CSS. The clock switching circuit CSW is configured so as to change the amplitudes of clocks CLKP1, CLKP2, CLKN1, and CLKN2 to arbitrary different values.

The operation of the second embodiment will now be described. Normally, in an EEPROM, a flash memory, or other semiconductor memory device, the absolute values of required positive high voltage and negative high voltage do not necessarily agree with each other. In the high voltage generating circuit according to the first embodiment, the voltage is usually increased or decreased in a stage by the value obtained by subtracting the threshold value of the MOS transistor functioning as a diode from a clock amplitude voltage. Therefore, the absolute value of the positive high voltage VPP obtained when only positive high voltage is output ideally agrees with the absolute value of the negative high voltage VBB obtained when only negative high voltage is output. Hence, the circuit according to the first embodiment cannot be used when the absolute value of the required positive high voltage does not agree with the absolute value of the required negative high voltage. When outputting both positive and negative high voltages, the positive high voltage VPP depends on the number of stages of the circuit constituent units on the switch SW2 end with the switch SW3 being the boundary, while the negative high voltage VBB depends on the number of stages of the circuit constituent units on the switch SW1 end with the switch SW3 being the boundary. Therefore, any other combinations of the positive and negative high voltages are not available.

Figure 6A:
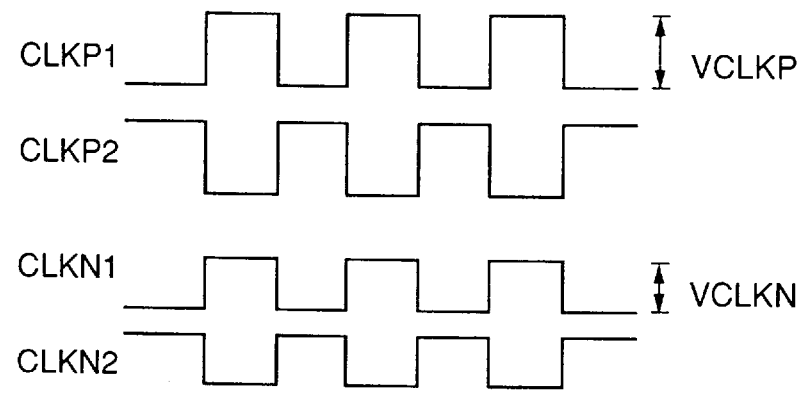
FIGS. 6A–6B show the clock waveforms in the second embodiment and the third embodiment.

In the second embodiment, as shown in FIG. 6A, for example, clocks CLKP1 and CLKP2 having a clock amplitude VCLKP optimum for the voltage value are supplied to generate the positive high voltage, whereas clocks CLKN1 and CLKN2 having a clock amplitude VCLKN optimum for the voltage value (which differs from clock amplitude VCLKP optimum); are supplied to generate the negative high voltage. For example, when only positive high voltage is needed, the switch SW11 turns ON, the switches SW13, SW12 turn OFF and signal lines S1, S3 are supplied with the clock CLKP1 and signal lines S2, S4 are supplied with the clock CLKP2. When only negative high voltage is needed, the switch SW12 turns ON, the switches SW11, SW13 turn OFF and signal lines S1, S3 are supplied with the clock CLKN1 and signal lines S2, S4 are supplied with the clock CLKN2. The method enables the outputs VPP and VBB to be produced, and makes it possible to output the positive high voltage and the negative high voltage having different absolute values of the voltages by a single high voltage generating circuit. To output both positive and negative high voltages at the same time, clocks CLKP1 and CLKP2 having the clock amplitude VCLKP optimum for obtaining a required positive high voltage are supplied to capacitors C53, C54, and C55 on a switch SW12 end, the switch SW13 being the boundary, while clocks CLKN1 and CLKN2 having the clock amplitude VCLKN optimum for obtaining a required negative high voltage are supplied to capacitors C51 and C52 on a switch SW11 end, the switch SW13 being the boundary. For example, the signal line S1 is supplied with the clock CLKN1, the signal line S2 is supplied with the clock CLKN2, the signal line S3 is supplied with the clock CLKP1, and the signal line S4 is supplied with the clock CLKP2. Thus, optimum positive and negative high voltages can be output at the same time by the single high voltage generating circuit.

Figure 6B:
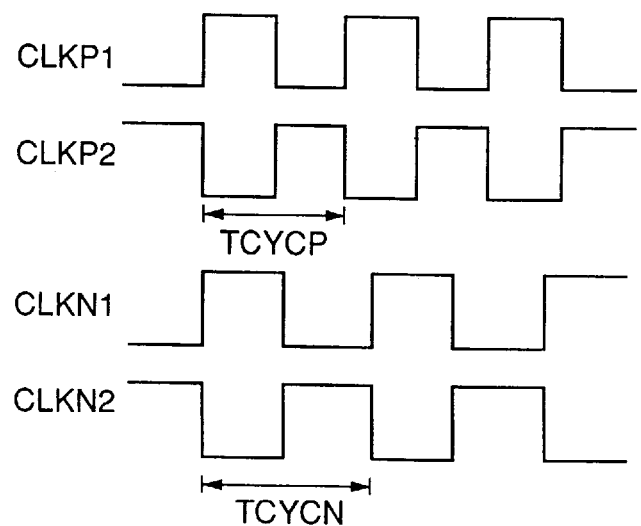

As a third embodiment, a clock frequency switching circuit which permits any desired clock frequencies to be set may be used as the clock switching circuit CSW in the high voltage generating circuit shown in FIG. 5. As illustrated in FIG. 6B, to generate a positive high voltage, the clocks CLKP1 and CLKP2 having a clock frequency TCYCP optimum for the voltage value are supplied; to generate a negative high voltage, clocks CLKN1 and CLKN2 having a clock frequency TCYCN optimum for the voltage value are supplied. Thus, the single high voltage generating circuit is able to output the positive high voltage and the negative high voltage having different absolute values of the voltages. Further, to output both positive and negative high voltages at the same time, the clocks CLKP1 and CLKP2 having a clock frequency optimum for obtaining a required positive high voltage are supplied to the capacitors C53, C54, and C35 on the switch SW12 end with the switch SW13 being the boundary, while the clocks CLKN1 and CLKN2 having a clock frequency optimum for obtaining a required negative high voltage are supplied to the capacitors C51 and C52 on the switch SW11 end with the switch SW13 being the boundary. By so doing, optimum positive and negative high voltages can be output at the same time by the single high voltage generating circuit.

As shown in FIG. 4, the absolute value of the voltages produced in mode 1 or 2 and in mode 3 is different. However, the absolute value of the voltages produced in mode 1 or 2 and in mode 3 can be made the same by the second or third embodiment according to the present invention.

Figures 7A, 7B:
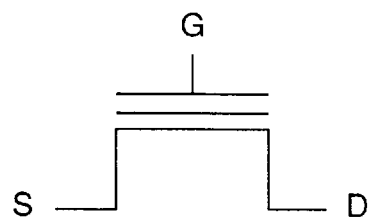
FIGS. 7A–B show a fourth embodiment of the present invention.

FIGS. 7A–7B show an example such that high voltage generating circuits of the first through third embodiments applies to the semiconductor memory cell. FIG. 7A is a memory cell used in flash memory. The memory cell has a gate electrode G, a source electrode S and a drain electrode D. FIG. 7B shows a write manner, and erase manner read manner.

In write manner, the gate of the memory cell is supplied with −9 V, the source is supplied with 6 V and the drain is open or in floating state. That is, the voltage applied to the gate and drain is produced by mode 3. In erase manner, the gate is supplied with 15 V, the source is open and the drain is supplied with ground level. That is, the voltage applied to the gate is produced by mode 1. In read manner, the gate is supplied with 6 V, the source is 1 V and the drain is supplied with ground level or is open. That is, the voltage applied to the gate is produced by mode 3. Accordingly, in write manner, the gate and the drain are applied to the respective voltage at the same time by a single high voltage generating circuit. In this embodiment, the voltage applied to the source in write manner and the voltage applied to the gate in read manner are the same. However, these voltages may be different. For example, the voltage applied to the source in write manner may be −7 V and the voltage applied to the gate in read manner may be 8 V. These voltages are produced by the method of the third or fourth embodiments according to the present invention.

Thus, in the first through fourth embodiments, the present invention has been described in terms of high voltage generating circuits which are composed of diodes and capacitors and which employ two-phase clocks; the present invention, however, is not limited thereto, and it may be applied in the same fashion to any other charge transport type high voltage generating circuit.

According to the present invention, the output of a high voltage generating circuit is connected to a voltage generator via switches provided at a node where the voltage becomes the highest, a node where the voltage becomes the lowest, and a node where the voltage takes an intermediate value; therefore, positive high voltage or negative high voltage can be selectively output or both positive and negative high voltages can be output at the same time from the nodes by selectively turning ON/OFF the switches. Moreover, any desired high voltages can be output by changing the amplitudes and frequencies of the clocks to be supplied. Thus, various high voltages can be output from a single circuit, so that the area required for installing the high voltage generating circuit on a chip can be markedly reduced and the chip size can accordingly be reduced even when the circuit is applied to a chip requiring various voltages.

What is claimed is:

1. A voltage generator comprising first, second and third circuit points, a plurality of first circuit units, and a plurality of second circuit units, each of said first and second circuit units including first and second nodes, a clock node, a rectifying element coupled between said first and second nodes and a capacitor coupled between said second node and said clock node, said first circuit units being coupled in series between said first and second circuit points such that said second node of a preceding one of said circuit units is connected to said first node of a succeeding one of said circuit units, said second circuit units being coupled in series between said second and third circuit points such that said second node of a preceding one of said circuit units is connected to said first node of a succeeding one of said circuit units, and said second circuit point being supplied continuously with a d.c. voltage during a period of time when first and second voltages are generated at said first and third circuit points, respectively.

2. The generator as claimed in claim 1, further comprising a switch coupled between said second circuit point and a voltage line receiving said d.c. voltage, said switch being rendered conductive during said period of time.

3. The generator as claimed in claim 2, wherein said rectifying element includes a transistor serving as a diode.

4. The generator as claimed in claim 3, wherein said transistor is a field effect transistor having a source and drain path coupled between said first and second nodes and a gate coupled to said first node.

5. A voltage generator comprising first, second and third circuit points, a plurality of first circuit units, and a plurality of second circuit units, each of said first and second circuit units including first and second nodes, a clock node, a rectifying element coupled between said first and second nodes and a capacitor coupled between said second node and said clock node, said first circuit units being coupled in series between said first and second circuit points such that said second node of a preceding one of said circuit units is connected to said first node of a succeeding one of said circuit units, said second circuit units being coupled in series between said second and third circuit points such that said second node of a preceding one of said circuit units is connected to said first node of a succeeding one of said circuit units, said voltage generator further comprising first and second voltage lines, a first switch coupled between said first voltage line and said first circuit point, a second switch coupled between said second circuit point and one of said first and second voltage lines, and a third switch coupled between said third circuit node and said second voltage line, one of said first to third switches being turned ON during a voltage generating operation.

6. The generator as claimed in claim 5, wherein said first switch is turned ON with both of said second and third switches being turned OFF when a first voltage is required to be generated at said third circuit point, said third switch being turned ON with both of said first and second switches being turned OFF when a second voltage is required to be generated at said first circuit point, and said second switch is turned ON with both of said first and third switches being turned OFF when third and fourth voltages are required to be generated at said first and third circuit points, respectively.

* * * * *